Patented Apr. 23, 1940

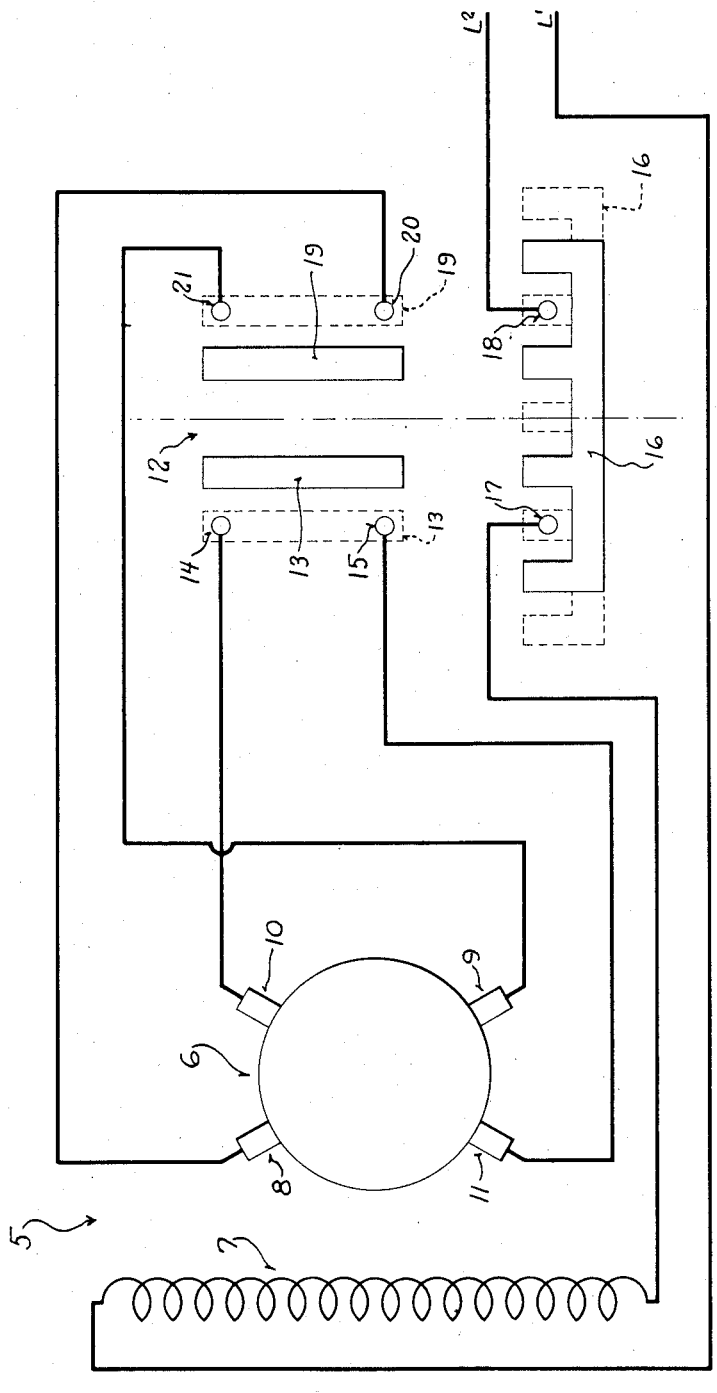

2,198,360

UNITED STATES PATENT OFFICE 2,198,360

ELECTRIC MOTOR

Wilbur R. Appleman, Wausau, Wis., assignor to Marathon Electric Manufacturing Corporation, Wausau, Wis., a corporation of Wisconsin Application October 31, 1938, Serial No. 237,866

2 Claims. (Cl. 172—179)

This invention relates to electric motors, particularly to repulsion, repulsion-induction and repulsion start induction-run motors, and has as an object to provide a simplified manner of reversing motors of this type.

With the above and other objects in view which will appear as the description proceeds, this invention resides in the novel construction, combination and arrangement of parts substantially as hereinafter described, and more particularly defined by the appended claims, it being understood that such changes in the precise embodiment of the herein-disclosed invention may be made as come within the scope of the claims.

The accompanying drawing illustrates one complete example of the physical embodiment of the invention constructed in accordance with the best mode so far devised for the practical application of the principles thereof, and in which:

The single figure is a diagrammatic view illustrating a practical embodiment of this invention.

Referring now particularly to the accompanying drawing in which like numerals indicate like parts, the numeral 5 designates an electric motor of the repulsion start induction run type having an armature 6 and field windings 7.

The direction of rotation in motors of this type is dependent upon the disposition of the armature brushes with relation to the field windings. Hence, by shifting these brushes, which are electrically connected, it is possible to effect a reversal in the direction of operation, but such shifting of the armature brushes would entail mechanism which would complicate the construction of the motor and introduce a possible source of trouble.

The present invention effects reversal of the motor in a simple manner entirely without the need for mechanical devices or mechanism and accomplishes this result by the provision of two sets of armature brushes 8—9 and 10—11. These sets of armature brushes are so disposed with relation to the field windings that when one set is electrically connected while the other is disconnected, the motor runs in one direction, and vice versa.

Selective electrical connection of the two sets of armature brushes is effected in any suitable manner, as for instance, through the use of a conventional drum controller switch 12. This switch may also be used to electrically connect the field windings 7 with the power supply lines $L^1$ and $L^2$ simultaneously with the connection of either set of armature brushes.

When the drum controller is in its neutral position, neither of the two sets of armature brushes are connected and the line $L^2$ leading to the field windings is broken. Moving the actuator of the drum controller in one direction engages one of its contactors 13 with contacts 14 and 15 connected, respectively, with the armature brushes 10 and 11 through appropriate conductors so that these brushes will be electrically connected.

Simultaneously with this adjustment of the controller actuator, a contactor 16 is shifted to electrically bridge contacts 17 and 18 and establish continuity in the supply line $L^2$. The motor then runs in one direction.

Actuation of the drum controller in its opposite direction beyond its neutral position engages its contactor 19 with contacts 20 and 21 connected, respectively, with the armature brushes 8 and 9 to electrically connect the same and also shift the contactor 16 to again bridge the contacts 17 and 18. With this position of the controller, the motor runs in the opposite direction.

From the foregoing description taken in connection with the accompanying drawing, it will be readily apparent to those skilled in the art, that this invention provides an exceptionally simple manner of reversing an electric motor of the type described, and that the desired objective is attained entirely without the need for mechanical devices or mechanisms.

It will also be readily apparent that while a two pole motor has been shown and specifically described, the invention is not restricted to this specific motor construction but is equally applicable to four, six, or eight pole motors; in fact, to motors of any number of poles. Where the armature is lap wound, it is, of course, necessary to have the number of brushes in each set correspond to the number of poles employed unless the commutator is cross-connected, but specific disclosure of the application of this invention to such multiple pole motors is unnecessary.

It is obvious to those skilled in the art that where, for instance, the motor has four poles, the armature brushes which would be electrically connected would be arranged at 90° to each other; and for motors having poles of other multiples, the armature brushes would be correspondingly arranged.

In all instances, however, there will be two sets of armature brushes to be selectively and alternately electrically connected to effect reversal in the direction of the motor operation; and, as will be readily apparent, each set of armature brushes may consist of two groups of brushes with the brushes in each group either permanently electrically connected or connected at the time of direction selection.

What we claim as our invention is:

1. In an alternating current motor of the character described, the combination of: an armature; a field winding having no electrical connection with the armature; a plurality of sets of brushes for the armature, the brushes of each set being spaced 180 electrical degrees apart, and the sets of brushes being so arranged with respect to the field winding that through selective electrical connection of the brushes thereof, the direction of rotation of the motor is determined; and common means for selectively electrically connecting any one set of armature brushes directly, and concomitantly therewith electrically connecting the field winding with a source of current, said common means maintaining the field winding connected with the source of current as long as and whenever any one set of armature brushes are connected.

2. In an alternating current electric motor of the character described: an armature; a field winding electrically disconnected from the armature; two sets of armature brushes, the brushes of each set being spaced 180 electrical degrees apart, and the two sets being so positioned with relation to the field winding that when one set is electrically connected and the other disconnected, the motor runs in one direction, and when the other set is electrically connected with the first named set disconnected, the motor runs in the opposite direction; an electric switch having one set of spaced contacts electrically connected with one set of armature brushes, and another set of contacts electrically connected with the other set of armature brushes; contactor means for selectively electrically connecting either set of contacts; and cooperating contacts and contactors for electrically connecting the field winding with a source of current when either set of contacts is electrically connected, said cooperating contacts being the only control for connecting the field winding with the current source and maintaining said field winding connected with the current source as long as and whenever either set of armature brushes is connected.

WILBUR R. APPLEMAN.